US006705943B2

(12) United States Patent
Awada

(10) Patent No.: US 6,705,943 B2
(45) Date of Patent: Mar. 16, 2004

(54) COMBINED POKER GAMES

(76) Inventor: Yehia Awada, 3982 Roundwood St., Las Vegas, NV (US) 89117

( * ) Notice: Subject to any disclaimer, the term of this patent is extended or adjusted under 35 U.S.C. 154(b) by 0 days.

(21) Appl. No.: 09/917,082

(22) Filed: Jul. 30, 2001

(65) Prior Publication Data

US 2003/0022709 A1 Jan. 30, 2003

(51) Int. Cl.[7] ........................................ A63F 13/00
(52) U.S. Cl. ........................................ 463/13; 273/292
(58) Field of Search ........................ 463/10–13; 273/292

(56) References Cited

U.S. PATENT DOCUMENTS

| | | | | | |
|---|---|---|---|---|---|
| 5,042,818 | A | * | 8/1991 | Weingardt | 463/13 |
| 5,486,005 | A | * | 1/1996 | Neal | 273/292 |
| 5,810,354 | A | * | 9/1998 | Banyai | 273/292 |
| 5,975,529 | A | * | 11/1999 | de Keller | 273/292 |
| 6,402,147 | B1 | * | 6/2002 | Lo | 463/13 |
| 6,402,150 | B1 | * | 6/2002 | Jones | 273/292 |

OTHER PUBLICATIONS

Three Fifty Seven (357 or 3–5–7) [http://www.oinc.net/poker/357.html]. Welcome to the Poler Page [http;//www.oinc.net/poker]. Last updated Jun. 7, 2001. Copyright 1999,2000,2001 Brian O'Neill (oneil@oinc.net).*
Pokerproducts, com:357 [http.//www.pokerproducts.com/howtoplay.html]. Copyright 1998–2002 POKERproducts.com.*

* cited by examiner

*Primary Examiner*—Mark Sager
*Assistant Examiner*—Aaron Capron
(74) *Attorney, Agent, or Firm*—Leonard Weiss

(57) ABSTRACT

In one of three table games and in one of two games played on a gaming machine, three card Stud Poker, five card Stud Poker and seven card Stud Poker are combined. In a second table game, five card Stud Poker and Seven Card Stud Poker are combined. In a third table game three card Stud Poker and seven card Stud Poker are combined. In a second game played on the gaming machine, five card Draw Poker and seven card Stud Poker are combined.

19 Claims, 10 Drawing Sheets

COMBINED POKER GAMES

BACKGROUND OF THE INVENTION

1. Field of Invention

This invention is in the general field of casino gaming and, more particularly, is a method of playing a game having features of a plurality of different types of poker games.

2. Description of the Prior Art

Poker is the most frequently played card game in the United States. A player in a Poker game wagers that he holds a Poker hand having a rank that is higher than a rank of a Poker hand held by any other player.

Almost invariant features of the Poker game is that it is played with a standard deck of fifty two cards and a Poker hand is comprised of five of the cards. The player with the Poker hand having the highest rank is usually the winner. Rankings of five card Poker hands, in descending order, are given as:

ROYAL FLUSH, (Ace, King, Queen, Jack and 10 of the same suit);

STRAIGHT FLUSH, (five cards in sequence in any suit, i.e. Jack, 10, 9, 8, 7, of the same suit);

FOUR OF A KIND, (four Aces is highest);

FULL HOUSE, (THREE OF A KIND plus a PAIR, i.e., 10, 10, 10, King King);

FLUSH (Five cards of the same suit);

STRAIGHT (five cards in sequence but of different suits, i.e., (Jack, 10, 9, 8, 7);

THREE OF A KIND (Three cards of the same rank, i.e., three Aces);

TWO PAIRS (i.e., two Kings and two 10's);

ONE PAIR (two 5's); and

NO PAIR

A ranking of cards comprising the five card Poker hand is germane to determining its rank. Thus, for example, the five card Poker hand that is comprised of a pair of 10's has a higher rank than the five card Poker hand that is comprised of a pair of 9's.

A well known variation of poker is a game called seven card stud poker where a player is dealt seven cards. A five card poker hand of the highest possible is selected from the seven dealt cards. Ranks of selected five card poker hands for all players are compared to determine a winner.

Usually, there are eight players in the seven card stud game. Prior to dealing a round of cards to the eight players, such as a round of first cards, for example, a dealer usually deals what is known as a burn card, face down, that is not used in forming the player's hands. Accordingly, seven burn cards are dealt during the seven card stud game. Because there are eight players and because of the burn cards, it may not be possible to provide a seventh card to all of the players. When it is not possible, the dealer deals a community card, face up, that is regarded as each player's seventh card.

A more recent variation of poker is a game called three card poker where three cards are dealt to each player. A ranking of a three card poker hand, in descending order, is given as:

ROYAL FLUSH

STRAIGHT FLUSH

THREE OF A KIND

STRAIGHT

FLUSH

ONE PAIR

The casino usually tries to promote games of the type where the player makes wagers against the casino rather than against the other players. By having the player wager against the casino there is an increase in the casino's revenue. Accordingly, a game where one player wagers against another player is not regarded as highly desirable by a casino manager.

Heretofore, there has not been a poker game that combines features of well known poker games. Combining features of different types of poker games into a single game would enhance the interest of a casino patron.

SUMMARY OF THE INVENTION

An object of the present invention is to provide a game that includes features of three card poker, five card stud Poker, five card Draw Poker and seven card stud Poker.

Another object of the invention is to provide a poker game where a payout is made by a casino to a winning player in accordance with a payout table.

According to one aspect of the invention, three cards are dealt to a player whereby the player has a three card Poker hand. The three cards are augmented by two cards whereby the player has five cards of a five card Poker hand. The five cards are augmented by two cards, whereby the player has a seven card Poker hand.

According to another aspect of the invention, five cards are dealt to a player whereby a player has a five card Stud Poker hand. The player is given an option of replacing a card of the five card Stud Poker hand whereby the player has a five card Draw Poker hand. The Draw Poker hand is augmented by two cards whereby the player has a seven card Stud Poker hand.

According to another aspect of the invention, three community cards form a three card Stud Poker hand. The three community cards additionally augment four cards dealt to a player to form a seven card Stud Poker hand.

According to another aspect of the invention, gaming machines are used to play a game that is a combination of three card Stud Poker, five card Stud Poker and seven card Stud and a game that is a combination of five card Draw Poker and seven card Stud Poker.

Other objects, features, and advantages of the invention should be apparent from the following description of the preferred embodiment thereof as illustrated in the accompanying drawing.

DESCRIPTION OF THE EMBODIMENTS

All games described hereinafter utilize a standard deck of fifty two cards.

Figure 1:
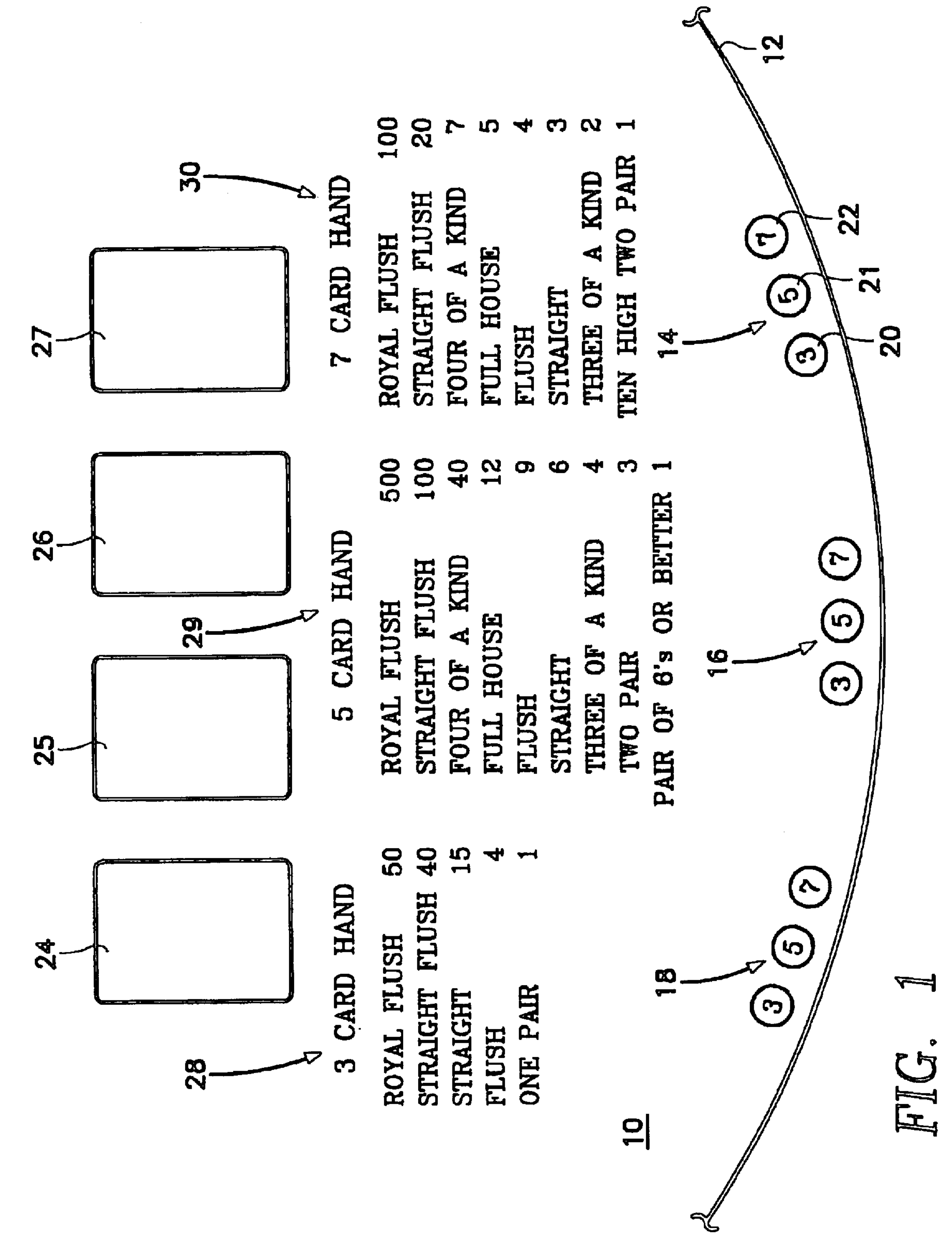
FIG. 1 is a plan view of a portion of a playing surface whereon a game is played in accordance with a first embodiment of the invention.

As shown in FIG. 1, in accordance with a first embodiment of the invention, a game is played on a semi-circular top surface 10 of a table that has an arcuate edge 12. Player stations 14, 16, 18 are proximal to the edge 12.

The player station 14 includes a showing of circles 20, 21, 22 with lettering of the numerals, 3, 5, 7, respectively, therein. The player stations 16, 18 have circles similar to those of the player station 14.

Community cards are used in the first embodiment. A showing of rectangular community card placement locations 24, 25, 26 are carried near the center of the surface 10. Additionally, lettering of a three card Stud Poker payout table 28, a five card Stud Poker payout table 29 and a seven card Stud Poker payout table 30 is carried upon the surface 10 at any suitable location.

The payout tables 28–30 provide pairs of entries. One entry of a pair is a poker rank; the other entry is a payout multiplier. Thus, for example, when a three card poker hand is a straight flush and there has been a three card Poker wager of one dollar by a player, there is a payout to a player of an amount equal to forty dollars (forty multiplied by one dollar).

Prior to a start of play, the station 14 player has an option of making any of three Stud Poker wagers that include a three card Stud Poker wager, a five card Stud Poker wager and a seven Stud card Poker wager. The Stud wagers are made by the station 14 player when cheques representative of the amounts of the three, five, and seven card wagers are placed within the circles 20–22, respectively. The station 16 and the station 18 players have a similar option and make wagers in a manner similar to that described hereinbefore. All of the players are required to make at least one of the three wagers.

After the Stud wagers have been made, three cards are dealt to each of the players whereby each of the players has a three card Stud Poker hand. As explained hereinafter, the three cards of the players are augmented by two community cards whereby each player has five cards of a five card Stud Poker hand. The five cards are augmented by an additional two community cards whereby each player has a seven card Stud Poker hand.

After the three cards are dealt, a community card is preferably placed face down upon each of the locations 24–27. Alternatively, community cards at the locations 24–27 are placed face up.

In one alternative embodiment, the community cards are dealt face down. After the three cards are dealt and prior to the community cards being turned face up, each of the players has an option of rescinding the seven card Stud Poker wager upon forfeiture of a portion of the seven card wager.

When the station 14 player has made the three card wager, a payout is made to the station 14 player in accordance with the table 28 whereby the station 14 player's three card wager is settled. Thus, for example, when the station 14 player's three card hand is a flush, the station 14 player wins a four to one payout. When the station 14 player's three card hand has a rank of less than one pair, the station 14 player loses the three card wager. In a similar manner, three card wagers of the station 16 player and the station 18 player are settled.

After all of the three card Stud Poker wagers have been settled, the cards at the locations 24, 25 are turned face up whereby the station 14 payer has a five card Stud Poker hand that includes the station 14 player's three cards augmented by the cards at the locations 24, 25. When the station 14 player has made the five card wager, a payout is made to the station 14 player in accordance with the table 29 whereby the station 14 player's five card Stud wager is settled.

Thus, for example, when the station 14 player's five card hand includes a full house, the station 14 player wins a twelve to one payout. When the station 14 player's five card hand has a rank of less than one pair of sixes, the station 14 player loses the five card wager. In a similar manner, five card wagers of the station 16 player and the station 18 player are settled.

After all of the five card wagers have been settled, the cards at the locations 26, 27 are turned face up whereby the station 14 player has a seven card Stud Poker hand that includes the station 14 player's three cards augmented by the cards at the locations 24–27. When the station 14 player has made the seven card wager, a payout is made to the station 14 player in accordance with the table 30 whereby the station 14 player's seven card wager is settled.

Thus, for example, when highest possible rank of five cards of the seven card hand of the station 14 player is four of a kind, the station 14 player receives a seven to one payout. When the highest possible rank of five cards of the station 14 player's seven card hand is less than two pair, tens high, the station 14 player loses the seven card wager. In a similar manner, seven card wagers of the station 16 player and the station 18 player are settled.

It should be understood that a wild card, such as a joker, may be included as a wild card in the first embodiment and in all other embodiments described hereinafter. Additionally, there may be a bonus payout to a player who has a hand that is a royal flush, for example.

Figure 2:
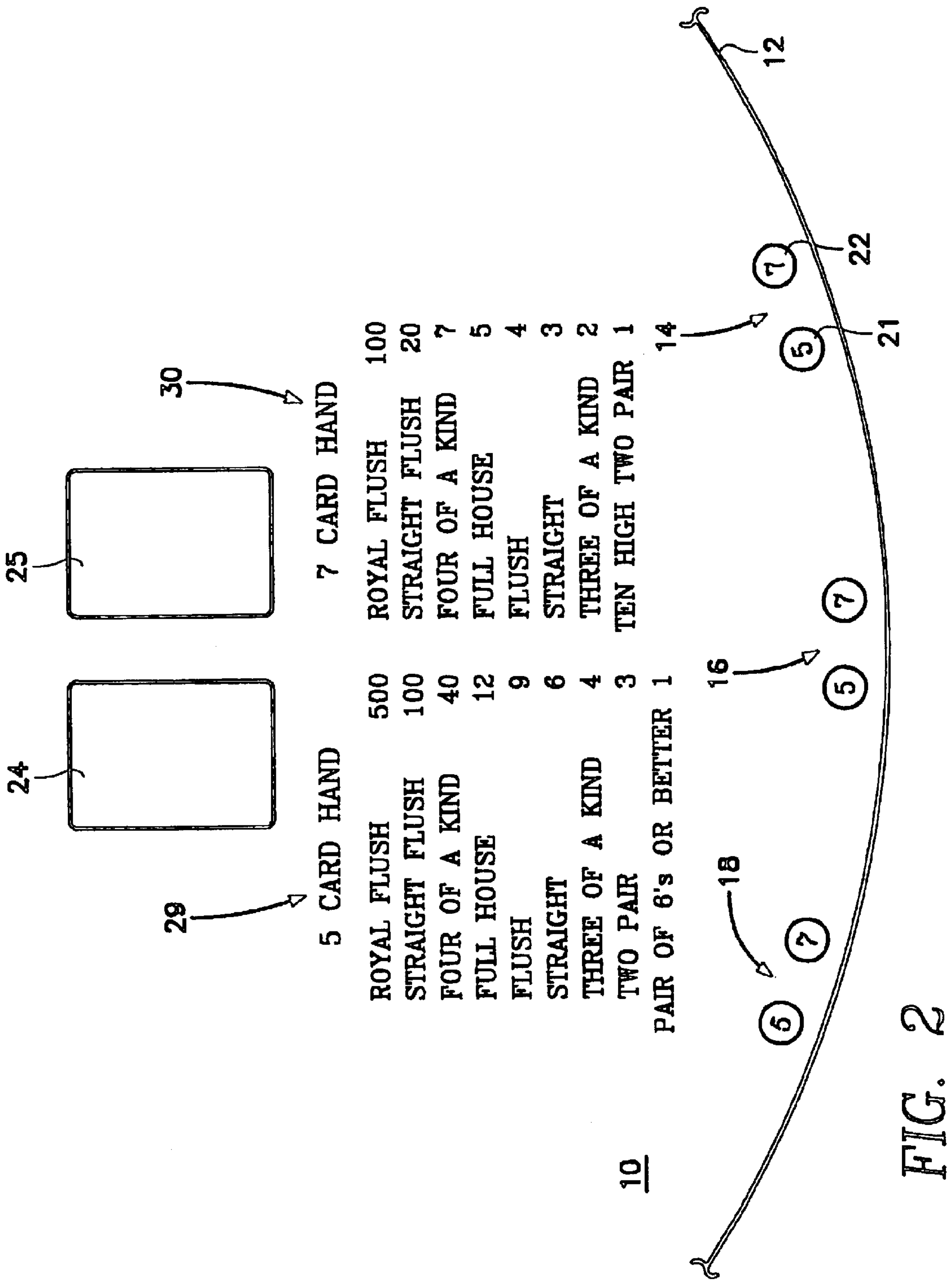
FIG. 2 is a plan view of a portion of a playing surface of a table where a game of is played in accordance with a second embodiment of the invention.

As shown in FIG. 2, in accordance with a second embodiment of the invention, the station 14 includes the circles 21, 22. The station 16 and the station 18 include similar circles. Additionally included are the card placement locations 24, 25 and the payout tables 29, 30.

Prior to a start of play, the station 14 player makes a five card Stud Poker wager and a seven car Stud Poker wager by placing cheques within the circles 21, 22, respectively. Similar wagers are made by the station 16 player and the station 18 player.

When the wagers have been made, five cards are dealt to the station 14 player and a card is placed, face down, at the location 24 and the location 25.

After reviewing the five dealt cards, the station 14 player has an option of doubling the seven card wager and an option of rescinding the seven card wager. When the recission option is exercised, the station 14 player forfeits a portion of the seven card wager.

The station 16 player and the station 18 player are dealt five cards, face down, and have options similar to those of the station 14 player. The five card wagers are settled in a manner similar to that described in the first embodiment.

After the five card wagers have been settled, cards at the locations 24, 25 are turned face up whereby the station 14 has a seven card Stud Poker hand comprised of the five dealt cards and the cards at the locations 24, 25. Similarly, the station 16 player and the station 18 player have seven card Stud Poker hands. The seven card wagers are settled in a manner similar to that described in the first embodiment. It should be understood that a joker may be included as a wild card in the second embodiment.

Figure 3:
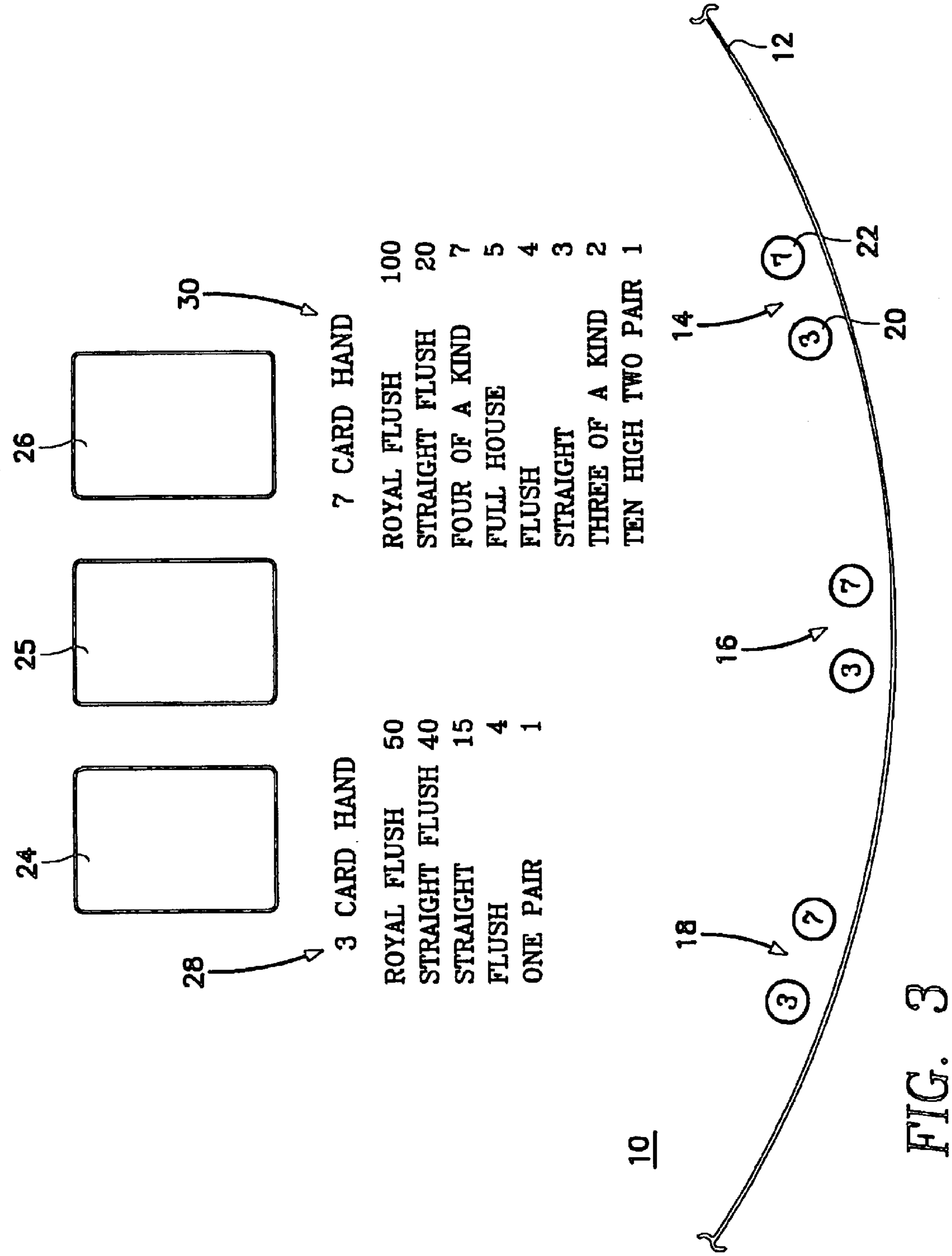
FIG. 3 is a plan view of a portion of a playing surface of a table where a game of is played in accordance with a third embodiment of the invention.

As shown in FIG. 3, in accordance with a third embodiment of the invention, the station 14 includes the circles 20, 22. The station 16 and the station 18 include similar circles. Additionally included are the card placement locations 24, 25, 26 and the payout tables 28, 30.

Prior to a start of play, the station 14 player makes a seven car Stud Poker wager by placing cheques within the circle 22. A similar wager is made by the station 16 player and the station 18 player.

When the wager has been made, four cards are dealt to the station 14 player and a community card is placed, face down, at the locations 24, 25, 26.

After reviewing the four dealt cards, the station 14 player has an option of making a three card Stud Poker wager. The station 16 player and the station 18 player have a similar option. Thereafter, the cards at the locations 24, 25, 26 are turned face up.

The cards at the locations 24, 25, 26 form a three card Stud Poker hand. When the station 14 player makes the three card wager, a three card payout is made to the station 14 player in accordance with the table 28.

The four cards dealt to the station 14 player and the cards at the locations 24, 25, 26 form a seven card Stud Poker hand. A seven card payout is made to the station 14 player in accordance with the table 30. Similar payouts are made to the station 16 player and to the station 18 player.

In accordance with a fourth embodiment of the invention, a gaming machine stores a signal representation of images of fifty two cards of a standard deck of cards. Prior to a start of play of the gaming machine, a player has an option of making any of three wagers that include a three card Stud Poker wager, a five card Stud Poker wager and a seven card Stud Poker wager. The wagers are made by depositing money representative of the wagers within the gaming machine.

Figure 3A:
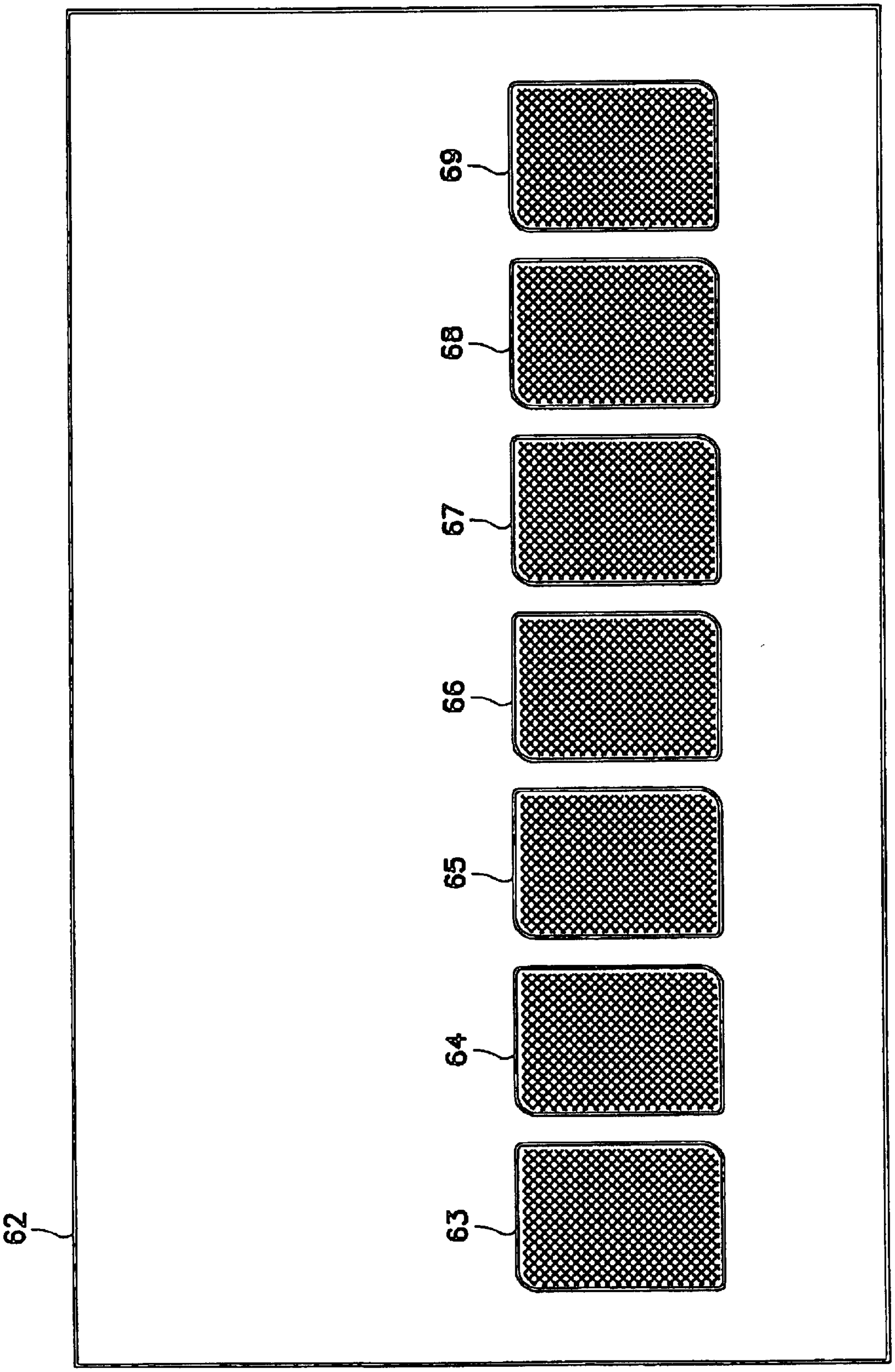
FIGS. 3*a*–3*d* are plan views of a video screen of a gaming machine used to play a game in accordance with a fourth embodiment of the invention.

As shown in FIG. 3*a*, after the money is deposited, a video screen 62 of the gaming machine provides a video image of cards 63–69, face down. Thereafter, the gaming machine player touches any three of the images 63–69.

Figure 3B:
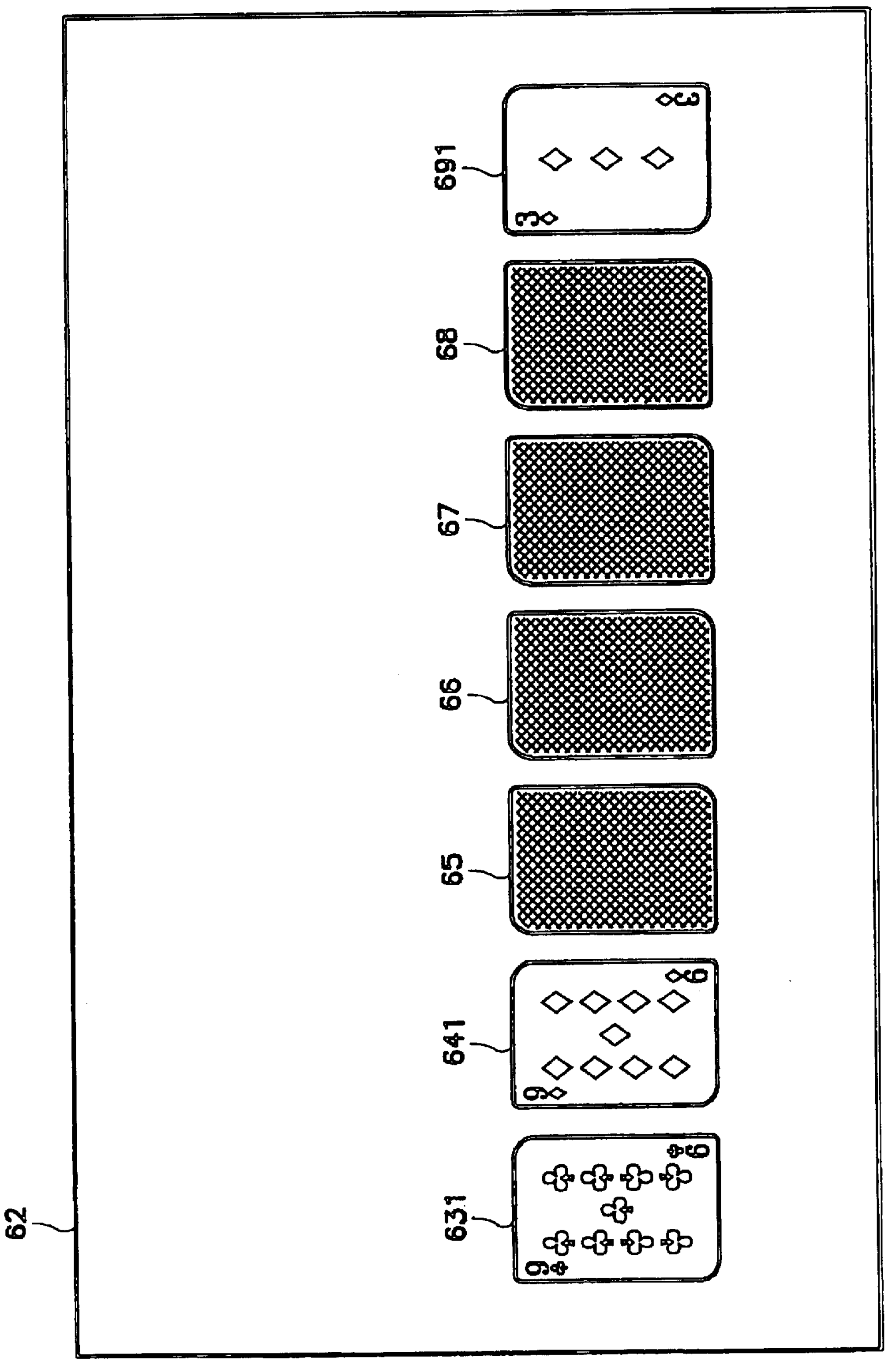

As shown in FIG. 3*b*, in response to the images 63, 64, 69 being touched, for example, they are replaced by images 631, 641, 691, respectively. The images 631, 641, 691 are of a nine of clubs, a nine of spades and a three of diamonds, respectively, thereby providing an image of a three card Stud Poker hand. A payout is made to the gaming machine player in accordance with the payout table 28 of the first embodiment, whereby the gaming machine player's three card wager is settled. After the gaming machine player's three card is settled, the gaming machine player touches any two of the images 65–68.

Figure 3C:
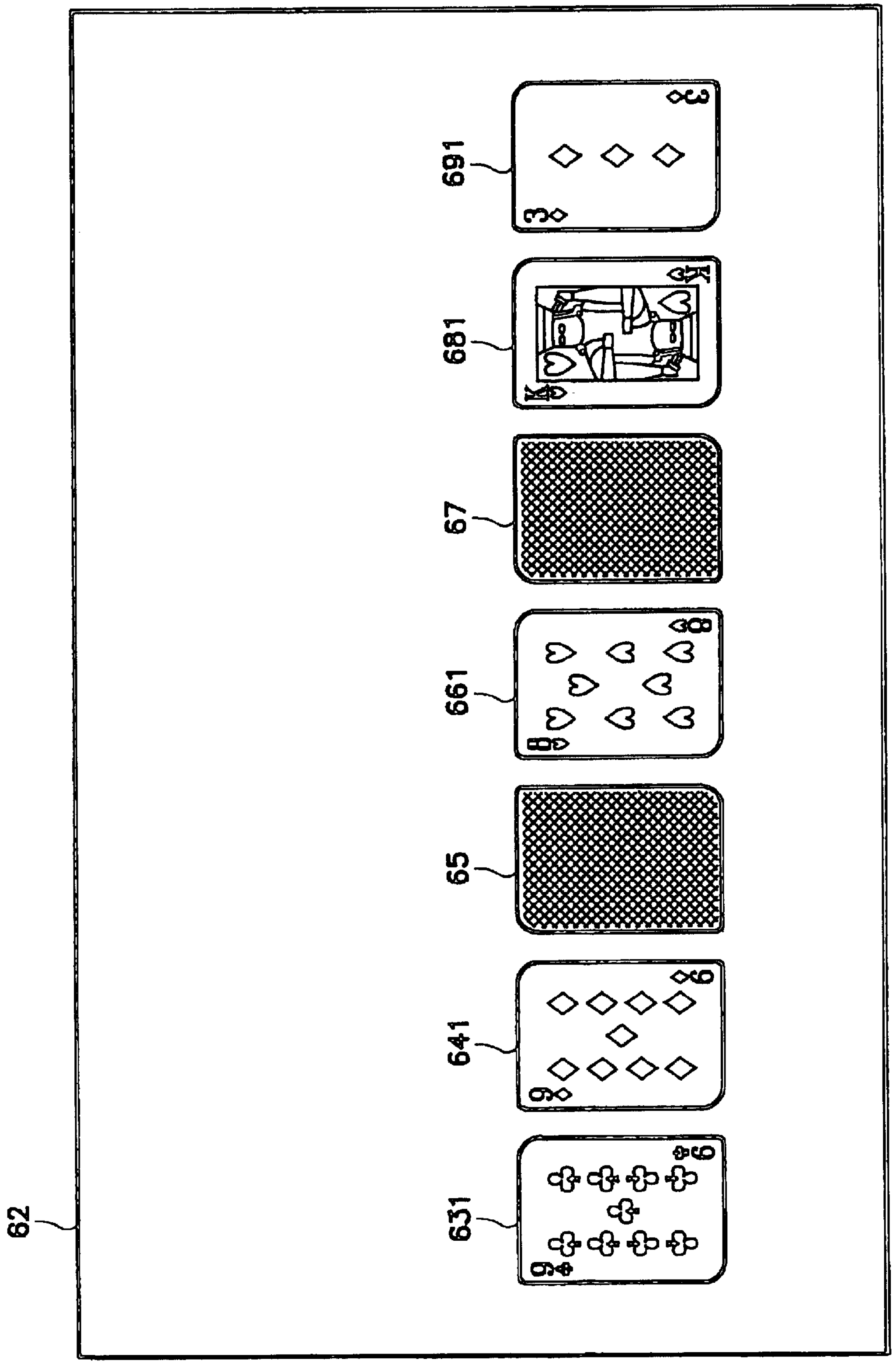

As shown in FIG. 3*c*, in response to the images 66, 68 being touched, for example, they are replaced by images 661, 681, respectively. The images 661, 681 are of an eight of hearts and a king of hearts, respectively, whereby an image of a five card Stud Poker hand comprised of the images 331, 341, 361, 381, 391 is provided. A payout is made to the gaming machine player in accordance with the payout table 29 of the first embodiment, whereby the gaming machine player's five card wager is settled. After the gaming machine player's five card wager is settled, the gaming machine player touches the images 65, 67.

Figure 3D:
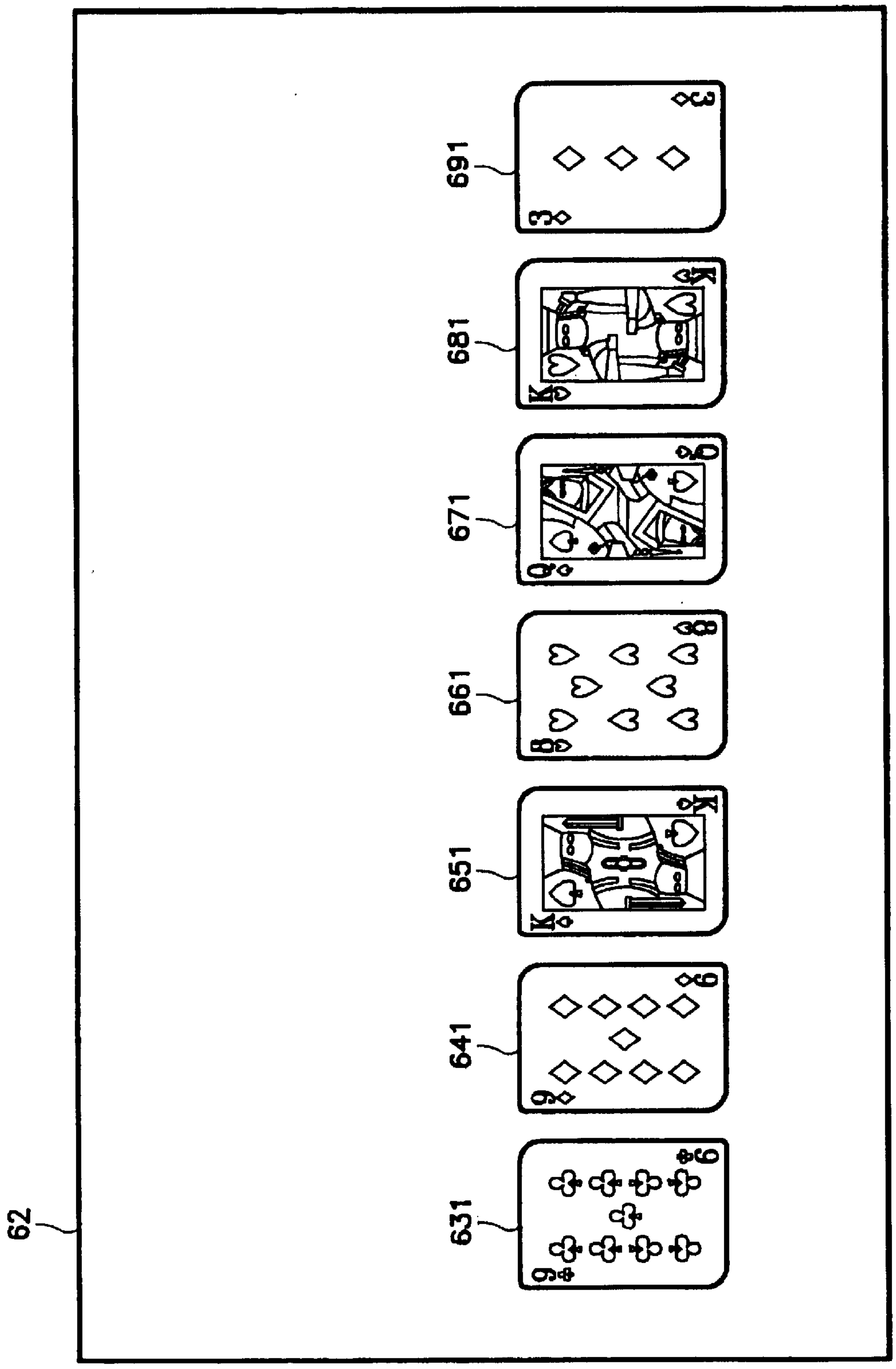

As shown in FIG. 3*d*, in response to the images 65, 67 being touched, they are replaced by images 651, 671, respectively. The images 651, 671 are of a king of spades and a queen of spades, respectively, whereby an image of a seven card Stud Poker hand comprised of the images 631, 641, 651, 661, 671, 681, 691 is provided. A payout is made to the gaming machine player in accordance with the payout table 30 of the first embodiment, whereby the gaming machine player's seven card Stud Poker wager is settled.

In accordance with a fifth embodiment of the invention, similar to that described hereinbefore, provides the gaming machine player with an option of making a five card Draw Poker wager and the seven card Stud Poker. Money representative of the five card Draw and seven card Stud wagers is deposited in the gaming machine.

After the money is deposited, the video screen 62 provides the video image of the cards 63–69 face down (FIG. 3*a*). Thereafter, the gaming machine player touches any five of the images 63–69.

Figure 4A:
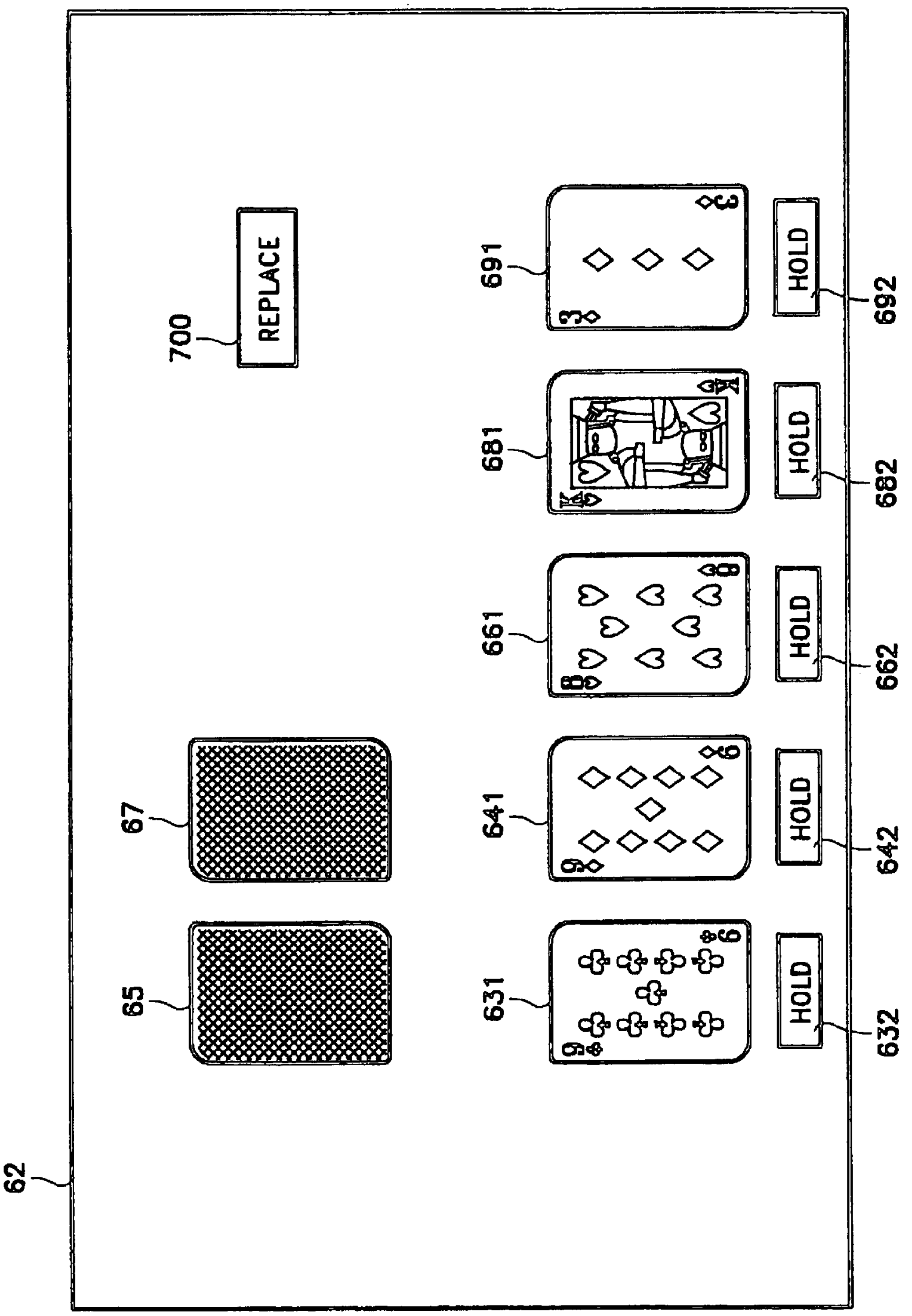
FIGS. 4*a*–4*c* are plan views of a video screen game is played in accordance with a fifth embodiment of the invention.

As shown in FIG. 4*a*, in response to the images 63, 64, 66, 68, 69 being touched, for example, they are replaced by the images 631, 641, 661, 681, 691. Additionally, images 632, 642, 662, 682, 692 of hold buttons are provided proximal to the images 631, 641, 681, 691, respectively. An image of a replace button 700 is positioned on the video screen 62 at any suitable location.

Figure 4B:
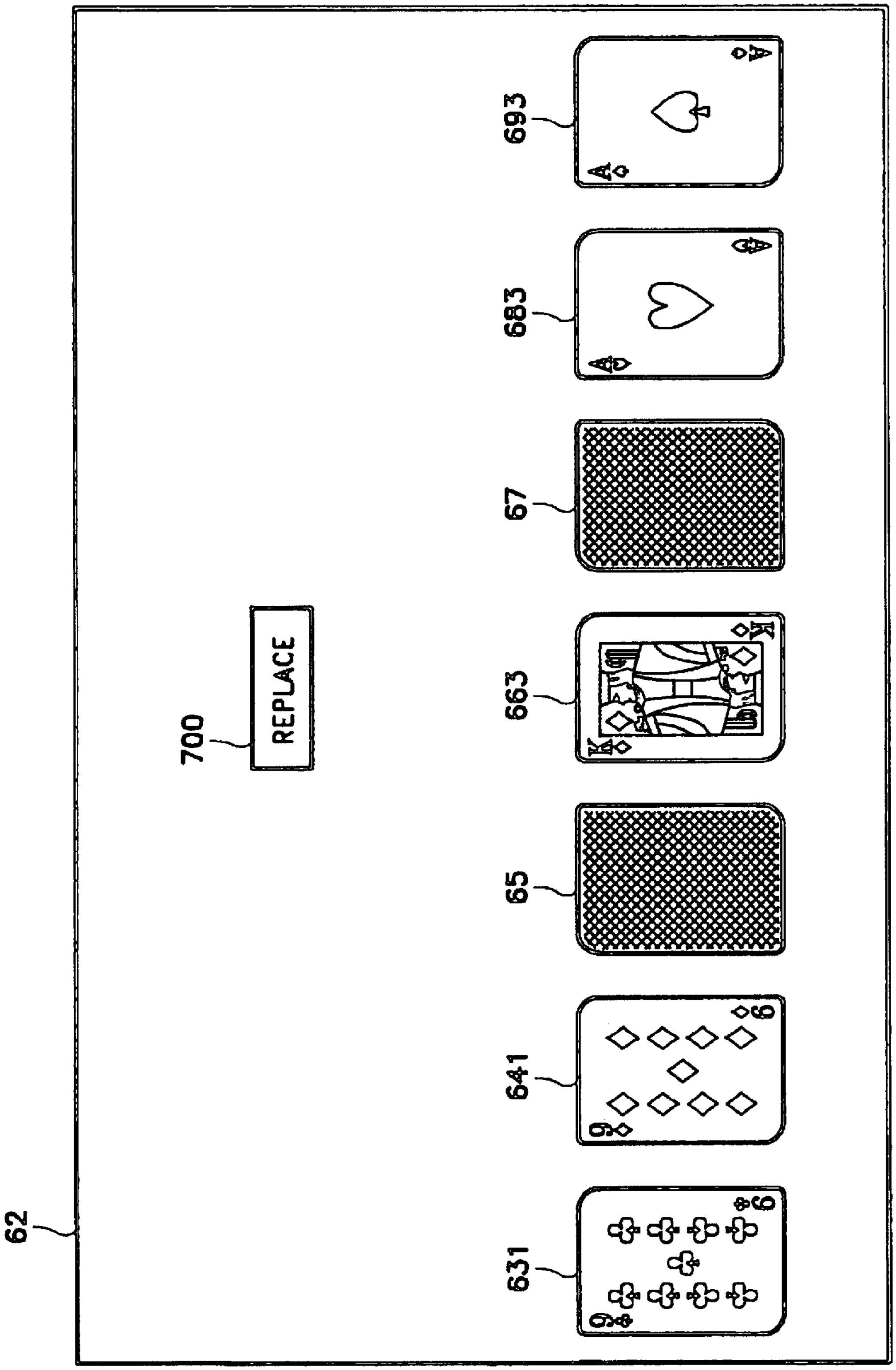

As shown in FIG. 4*b*, in response to the gaming machine player touching the hold buttons 662, 682, 692 (FIG. 4*a*), for example, and then making a first touching the image 700, the images 661, 681, 691 are replaced by images 663, 683, 693 which are the king of diamonds, ace of hearts and ace of spades, respectively. Hence, the gaming machine player has a five card Draw Poker hand comprised of cards having the images 631, 641, 663, 683, 693.

A payout is made to the gaming machine player in accordance with a five card Draw Poker payout table (not shown) whereby the gaming machine player's five card Draw Poker wager is settled. After the gaming machine player's five card Draw Poker wager is settled, the gaming machine player makes a second touching of the image 700.

Figure 4C:
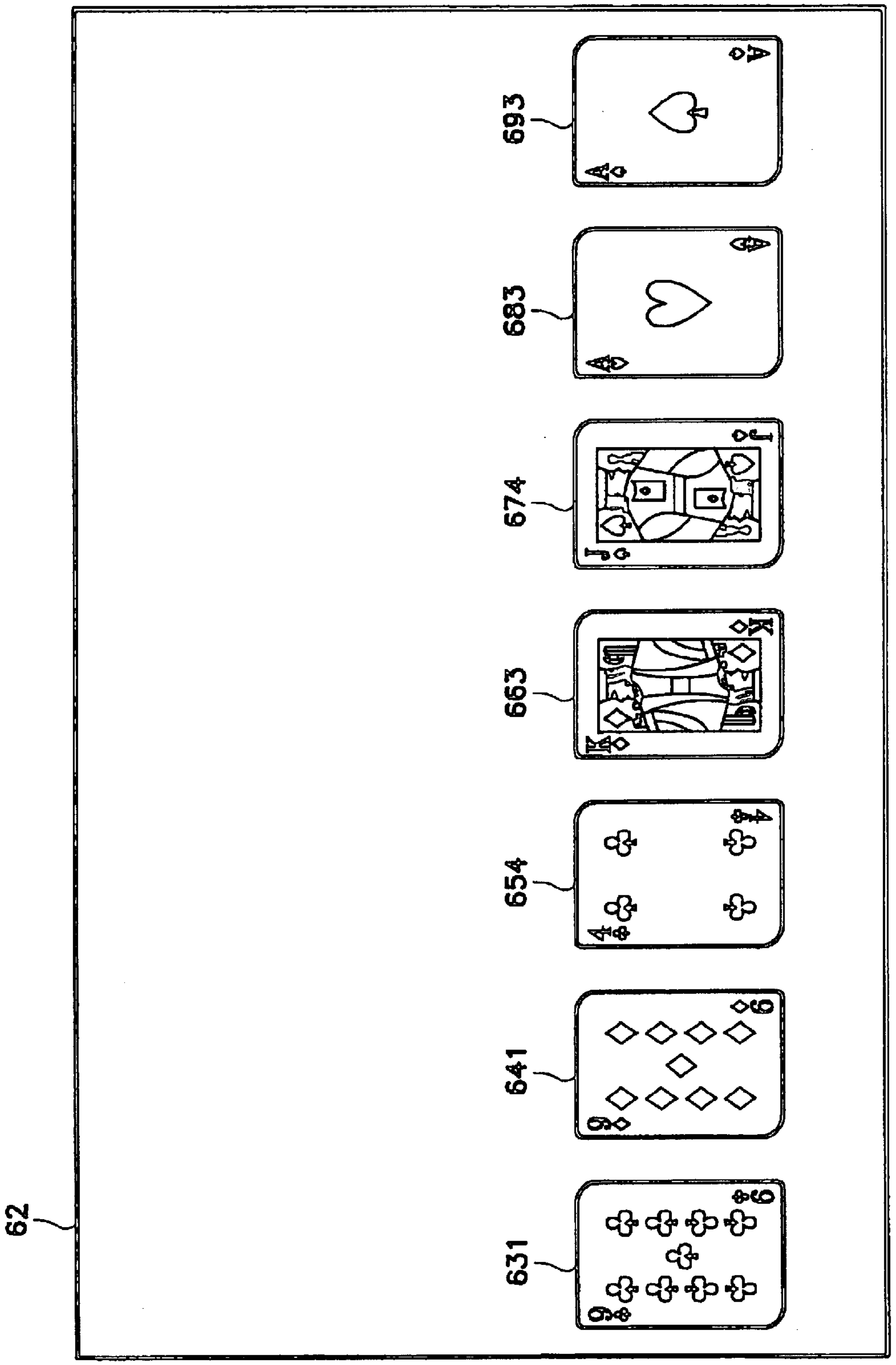

As shown in FIG. 4*c*, in response to the images 65, 67 being touched, the images 65, 67 are replaced by images 654, 674, respectively. The images 654, 674 are of a four of clubs and a jack of spades, respectively, whereby an image of a seven card Stud Poker hand comprised of the images 631, 641, 654, 663, 674, 683, 693 is provided. A payout is made to the gaming machine player in accordance with a modified seven card Stud Poker payout table (not shown), whereby the gaming machine player's seven card Stud Poker wager is settled.

It should be understood that games corresponding to those disclosed herein may be played on the internet or on a computer.

While the invention has been particularly shown and described with reference to embodiments, it should be understood by those skilled in the art that changes in form and detail may be made therein without departing from the spirit and scope of the invention.

I claim:

1. In the method of using a standard deck of fifty two cards to play a game, comprising the steps of:

dealing three cards to a player;

providing an opportunity for the player to make a wager on a rank of a Poker hand formed from said dealt cards;

dealing out four community cards;

giving the player an option of making a five card Poker wager and a seven card Poker wager;

augmenting said player's three cards with two of said community cards to form a five card Stud Poker hand; and augmenting said player's three cards with said four community cards to form a seven card Stud Poker hand; and settling said wagers in accordance with a payout table.

2. In the method of claim 1 wherein said step of settling comprises the steps of:

making a three card payout to said player based upon a rank of said three card Poker hand;

making a five card payout to said player based upon a rank of said five card Poker hand; and making a seven card payout to said player based upon a rank of said seven card Poker hand.

3. In the method of claim 1 wherein said community cards are dealt face down.

4. In the method of claim 1 wherein said community cards are dealt face up.

5. In the method of claim 1 wherein a joker is used as a wild card in playing the game.

6. In the method of claim 1 comprising the additional step of making a bonus payout to said player when a Poker hand has a rank higher than a known rank.

7. In the method of claim 1 wherein said player has an option of making a five card Poker wager and said player is dealt five cards to form a five card poker hand, and two community cards are dealt out face down, comprising the additional steps of:

a player of making a seven card wager; and augmenting said five cards with said two community cards to form a seven card Stud Poker hand.

8. The method of claim 7 comprising the additional steps of:

making a five card payout to said player based upon a rank of said five card Poker hand; and making a seven card payout to said player based upon a rank of a selected five cards of said seven card hand.

9. In the method of claim 7, comprising the additional step of permitting said player to increase said seven card Stud Poker wager prior to either of said community cards being turned face up.

10. In the method of claim 7, comprising the additional step of permitting said player to rescind said seven card wager upon forfeiture of a portion of said seven card Stud Poker wager.

11. In the method of claim 7 wherein a joker is used as a wild card in playing the game.

12. In the method of claim 7 comprising the additional step of making a bonus payout to said player when a Poker hand has a rank higher than a known rank.

13. In a method of using a standard deck of fifty two cards to play a game, comprising the steps of:

a player making a seven card Stud Poker wager;

dealing four cards to said player;

dealing out three community cards face down;

giving said player an option of making a three card Stud poker wager after said four cards are dealt;

turning said community cards face up, a three card Stud Poker hand being formed by said community cards and a seven card Stud Poker hand being formed by said four cards augmented by said community cards;

making a three card payout to said player based upon the rank of said three card hand; and making a seven card payout to said player based upon a rank of a selected five cards of said seven card hand.

14. In the method of claim 13 wherein a joker is used as a wild card in playing the game.

15. In the method of claim 13 comprising the additional step of making a bonus payout to said player when a Poker hand has a rank higher than a known rank.

16. In the method of playing a Poker game on a gaming machine that stores signal representations of images of fifty two cards of a standard deck of cards, comprising the steps of:

giving a player an option of making a payment representative of a three card wager, a five card wager and a seven card wager;

causing a video screen of the gaming machine to provide an image of each of seven cards that are face down;

said player causing said video screen to replace three of said face down images with images of three cards that are face up, thereby providing an image of a three card Stud Poker hand, face up and images of four cards that are face down;

making a three card payout to said player based upon a rank of said three card hand, thereby settling said three card wager;

said player causing images of two of said four face down cards to be replaced by images of two cards that are face up, thereby providing an image of a five card Stud Poker hand and images of two cards that are face down;

making a five card payout to said player based upon a rank of said five card hand, thereby settling said five card wager;

said player causing images of said two face down cards to be replaced by images of two cards that are face up, thereby providing images of seven cards face up that form a seven card hand; and making a seven card payout to said player based upon a rank of five cards of said seven card hand.

17. In the method of claim 16 wherein said gaming machine stores a signal representation of a joker which is a wild card.

18. In the method of playing a Poker game on a gaming machine that stores signal representations of images of fifty two cards of a standard deck of cards, comprising the steps of:

giving a player an option of making a payment representative of a five card wager and a seven card wager;

causing a video screen of the gaming machine to provide initial images of five cards face up;

said player causing said video screen to replace any of said initial images with images of cards that are face up, thereby providing an image of a five card Draw Poker hand;

making a Draw Poker payout to said player based upon the rank of said Draw Poker hand, whereby said player's five card wager is settled;

providing images of two additional cards face up, thereby providing an image of a seven card Stud Poker hand; and making a seven card Stud Poker payout to said player based upon a rank of five cards of said Stud Poker hand, whereby said player's seven card wager is settled.

19. In the method of claim 18 wherein said gaming machine stores a signal representation of a joker which is a wild card.

* * * * *